Patented Aug. 13, 1940

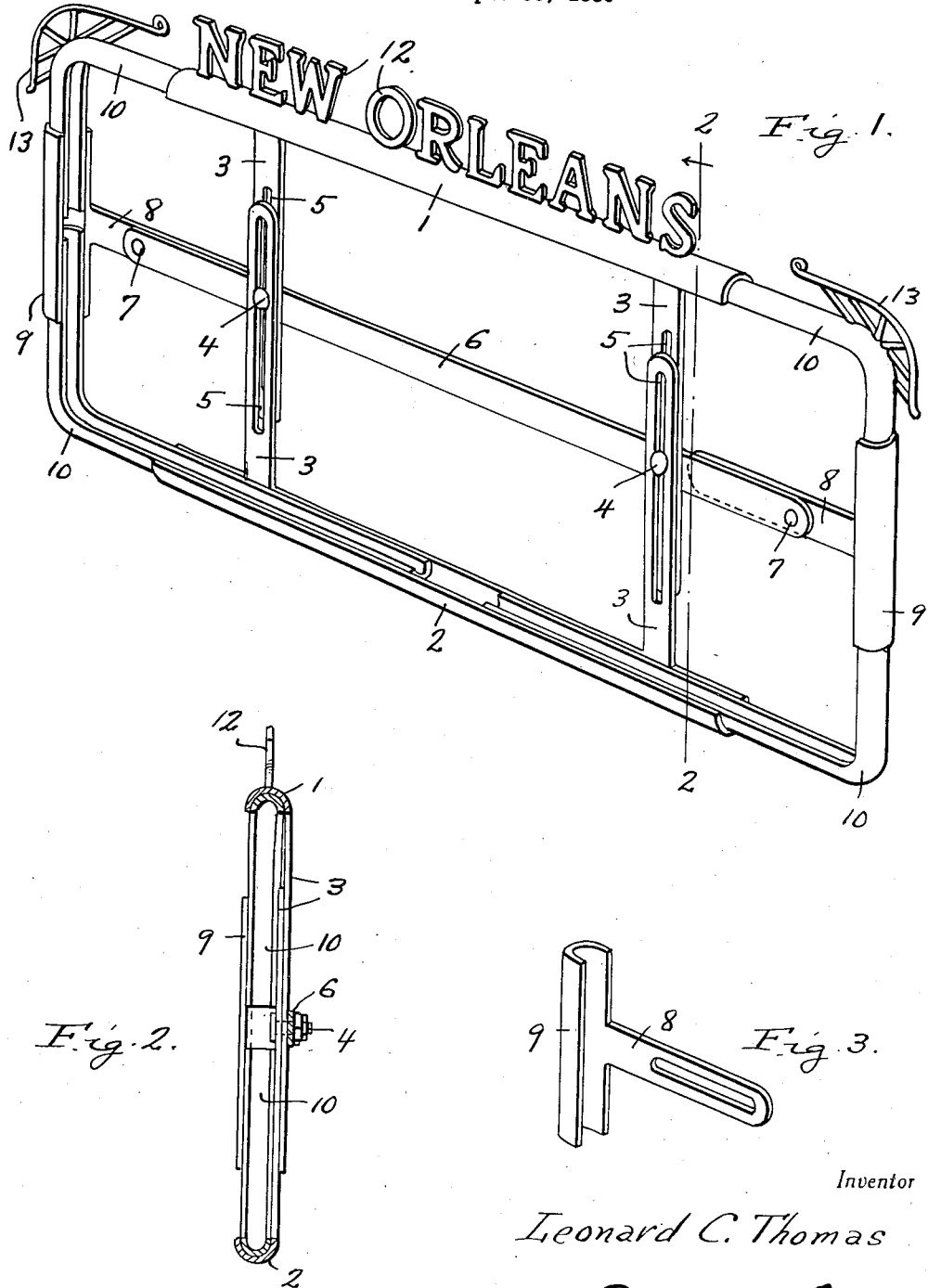

2,211,085

UNITED STATES PATENT OFFICE 2,211,085

LICENSE PLATE FRAME

Leonard C. Thomas, New Orleans, La.

Application September 30, 1939, Serial No. 297,373

2 Claims. (Cl. 40—125)

The present invention relates to new and useful improvements in license plate frames for motor vehicles and has for its primary object to provide, in a manner as hereinafter set forth, a device of this character which is capable of expeditious adjustment to accommodate different sizes of plates.

Other objects of the invention are to provide an automobile license plate frame which will be comparatively simple in construction, strong, durable, attractive in appearance, light in weight, and which may be manufactured at low cost.

All of the foregoing and still further objects of the invention will become apparent from a study of the following specification, taken in connection with the accompanying drawing wherein like characters of reference designate corresponding parts throughout the several views, and wherein:

Figure 1 is a perspective view of a license plate frame constructed in accordance with the present invention.

Fig. 2 is a vertical sectional view, taken substantially on the line 2—2 of Fig. 1.

Fig. 3 is a detail view in perspective of one of the end members.

Referring now to the drawing in detail, it will be seen that the embodiment of the invention which has been illustrated comprises substantially channel-shaped upper and lower sections 1 and 2, respectively, of suitable metal. Mounted on the sections 1 and 2 are overlapping connecting bars 3. The bars 3 are adjustably secured together through the medium of bolts 4 which pass through slots 5 which are provided therefor in said bars 3.

Secured on the bars 3 by the bolts 4 is a horizontal metallic bar 6. Adjustably secured by bolt and slot connections 7 on the end portions of the bar 6 are extensions 8. Substantially channel-shaped frame sections 9 are provided on the outer ends of the extensions 8.

The reference numeral 10 designates angular corner sections of substantially channel shaped cross sections having their end portions adjustably engaged in the frame sections 1, 2 and 9. It will thus be seen that a complete frame has been provided for the reception of a license plate. The name of any desired state, city, et cetera may appear in letters on the frame section 1 as at 12. Then, the uppermost corner sections 10 may be suitably ornamented as at 13.

It is thought that the manner in which the frame is used will be readily apparent from a consideration of the foregoing. The license plate is mounted in the device and rests on the members 3, 6, et cetera. The sections comprising the frame are then closed on the license plate and the nuts on the bolts 4 and 7 are tightened thereby securing the frame firmly in position on the marginal edges of said license plate. It will thus be seen that a frame has been provided which may be expeditiously adjusted to accommodate different sizes of plates. Of course, the edges of the plates are engaged in the channels of the members 1, 2, 9 and 10.

It is believed that the many advantages of an adjustable license plate frame constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A license plate frame comprising substantially channel shaped upper and lower sections, connecting bars on said sections, said connecting bars extending in overlapping relation and having communicating slots therein, bolts extending through the slots for securing the bars in adjusted position relative to each other, a bar mounted on the bolts, extensions pivotally mounted and slidably adjustable on the end portions of the second named bar, and substantially channel shaped end sections on said extensions, the upper, lower and end sections being adapted to receive the marginal portions of a license plate.

2. An adjustable license plate frame comprising substantially channel shaped upper and lower sections, overlapping bars on said sections, said bars having communicating slots therein, bolts engaged in the slots for securing the bars together in adjusted position, a horizontal bar mounted on the bolts, extensions mounted for longitudinal adjustment on the end portions of said horizontal bar, substantially channel shaped end sections on said extensions, and angular corner sections of substantially channel shaped cross section having their end portions adjustably engaged in the upper, lower and end sections.

LEONARD C. THOMAS.